(12) United States Patent
Johry et al.

(10) Patent No.: US 11,372,840 B2
(45) Date of Patent: Jun. 28, 2022

(54) VALIDATION OF DATA VALUES CONTAINED IN RESPONSES FROM SERVER SYSTEMS

(71) Applicant: Oracle International Corporation, Redwood Shores, CA (US)

(72) Inventors: Rohit Johry, Bengaluru (IN); Somashekar Gudiputi, Bengaluru (IN); Allamaprabhu Gangavathi, Bengaluru (IN); Kokilavani Chandrasekaran, Bengaluru (IN)

(73) Assignee: Oracle International Corporation, Redwood Shores, CA (US)

( * ) Notice: Subject to any disclaimer, the term of this patent is extended or adjusted under 35 U.S.C. 154(b) by 329 days.

(21) Appl. No.: 16/177,474

(22) Filed: Nov. 1, 2018

(65) Prior Publication Data

US 2020/0142981 A1    May 7, 2020

(51) Int. Cl.
*G06F 16/23* (2019.01)
*G06F 11/36* (2006.01)
(Continued)

(52) U.S. Cl.
CPC ...... *G06F 16/2365* (2019.01); *G06F 11/3664* (2013.01); *G06F 11/3668* (2013.01); *G06F 16/245* (2019.01); *G06F 16/27* (2019.01)

(58) Field of Classification Search
CPC .. G06F 11/36; G06F 11/3664; G06F 11/3668; G06F 16/27; G06F 16/2365; G06F 16/245; G06F 16/955; G06F 2221/033
See application file for complete search history.

(56) References Cited

U.S. PATENT DOCUMENTS 8,386,419 B2 * 2/2013 Yalamanchilli ....... G06F 16/254
707/602
8,515,999 B2   8/2013 de Cerqueira Gatti et al.
(Continued)

OTHER PUBLICATIONS

Umbrich, J., Hose, K., Karnstedt, M. et al. Comparing data summaries for processing live queries over Linked Data. World Wide Web 14, 495-544 (2011). https://doi.org/10.1007/s11280-010-0107-z (Year: 2011).*
(Continued)

*Primary Examiner* — Dennis Truong
(74) *Attorney, Agent, or Firm* — IPHorizons PLLC; Narendra Reddy Thappeta

(57) ABSTRACT

An aspect of the present disclosure facilitates validation of responses received from server systems. In one embodiment, data values are maintained in a data source. Upon sending a request containing a query criteria to a server system, the server system retrieves data values satisfying the query criteria from the data source. A (actual) response is received from the server system, the actual response containing data values retrieved by the server system. Data values satisfying the query criteria are also retrieved directly from the data source and an expected response is constructed by incorporating the directly retrieved data values. The data values contained in the expected and the actual responses are then compared to determine a difference between the expected and actual responses as a basis for validating the actual response received from the server system for the request.

20 Claims, 13 Drawing Sheets

(51) Int. Cl.
   *G06F 16/245* (2019.01)
   *G06F 16/27* (2019.01)
   *G06F 16/955* (2019.01)

(56) References Cited

U.S. PATENT DOCUMENTS

| | | | |
|---|---|---|---|
| 8,745,641 B1* | 6/2014 | Coker | G06F 11/3668 |
| | | | 719/328 |
| 8,745,718 B1 | 6/2014 | Dufel et al. | |
| 9,235,607 B1* | 1/2016 | Ross | G06F 16/215 |
| 9,552,237 B2 | 1/2017 | Biesack | |
| 9,558,020 B2 | 1/2017 | Feng et al. | |
| 9,600,405 B1* | 3/2017 | Dunn | G06F 11/36 |
| 9,600,547 B2 | 3/2017 | Holmes et al. | |
| 10,318,412 B1* | 6/2019 | McKearney, Jr. | G06F 11/3684 |
| 10,929,281 B1* | 2/2021 | Sicard-Cras | G06F 16/2365 |
| 2007/0282883 A1* | 12/2007 | Bolstad | G06F 16/258 |
| 2009/0164621 A1* | 6/2009 | Kothari | H04L 43/00 |
| | | | 709/224 |
| 2009/0313606 A1* | 12/2009 | Geppert | G06F 11/3692 |
| | | | 717/124 |
| 2010/0192006 A1* | 7/2010 | Gharat | G06F 11/3688 |
| | | | 714/5.1 |
| 2012/0290527 A1* | 11/2012 | Yalamanchilli | G06F 16/283 |
| | | | 707/602 |
| 2013/0117609 A1* | 5/2013 | Dande | G06F 11/3692 |
| | | | 714/32 |
| 2014/0068047 A1 | 3/2014 | Williams et al. | |
| 2014/0279942 A1* | 9/2014 | Siepmann | G06F 16/21 |
| | | | 707/690 |
| 2014/0359581 A1* | 12/2014 | Soshin | G06F 11/3688 |
| | | | 717/126 |
| 2015/0026027 A1* | 1/2015 | Priess | G06Q 20/4016 |
| | | | 705/35 |
| 2015/0154097 A1* | 6/2015 | Duda | G06F 11/3688 |
| | | | 714/38.1 |
| 2015/0212920 A1* | 7/2015 | Kraus | G06F 11/36 |
| | | | 717/127 |
| 2016/0246838 A1* | 8/2016 | Li | G06F 11/3684 |
| 2017/0289253 A1* | 10/2017 | Graefe | H04L 67/02 |
| 2017/0330479 A1* | 11/2017 | Bowman | G09B 5/125 |
| 2017/0371772 A1* | 12/2017 | Koplovich | G06F 11/3664 |
| 2017/0374155 A1 | 12/2017 | Chen | |
| 2018/0337840 A1* | 11/2018 | Goyal | G06F 11/36 |
| 2019/0384664 A1* | 12/2019 | Rondeau | G06F 11/2242 |

OTHER PUBLICATIONS

Getting started with JSON features in Azure SQL Database, https://docs.microsoft.com/en-us/azure/sql-database/sql-database-json-features, downloaded circa May 7, 2018, pp. 1-8.

Testing and validating API responses with JSON Schema, https://assertible.com/blog/testing-and-validating-api-responses-with-json-schema, downloaded circa May 7, 2018, pp. 1-8.

* cited by examiner

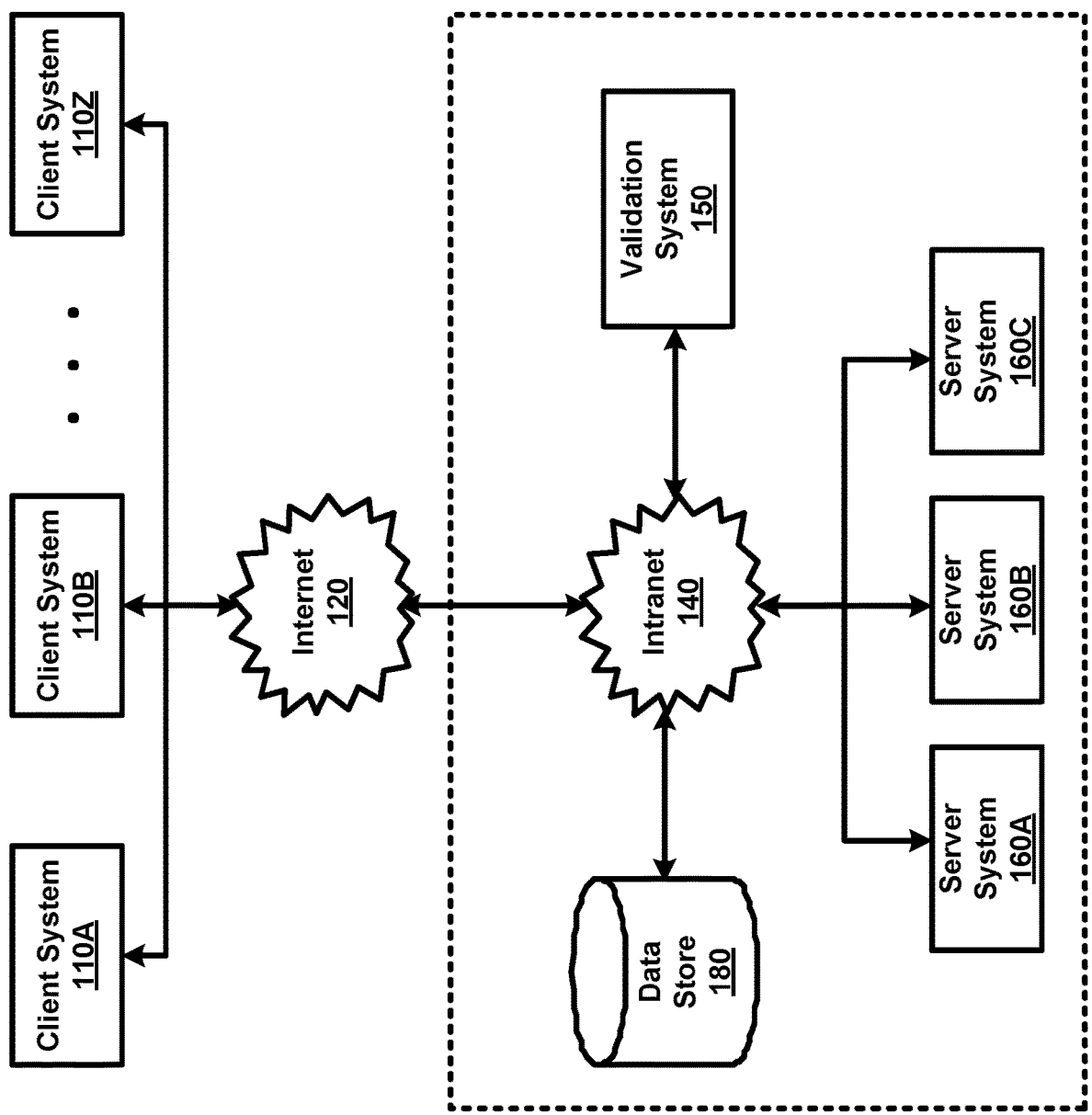

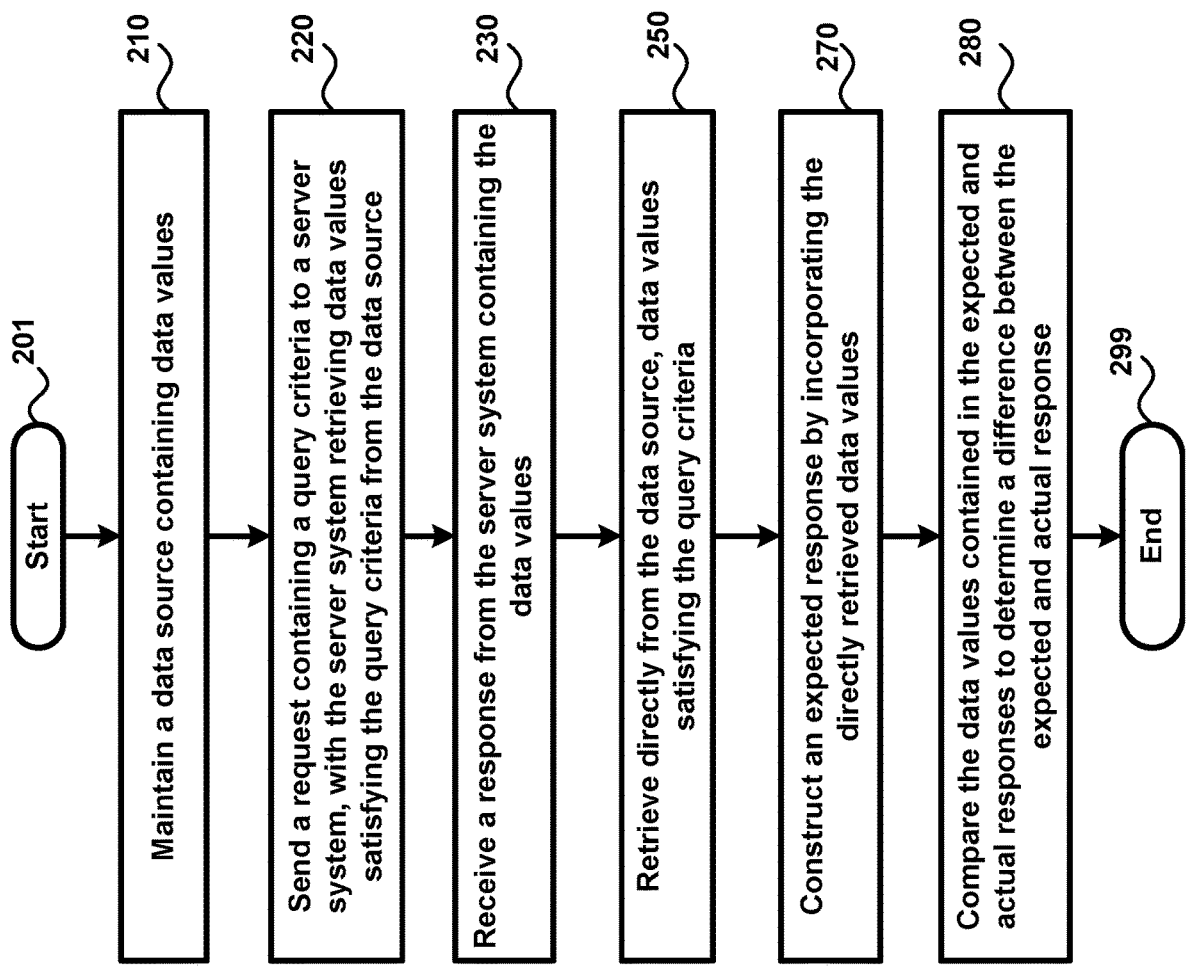

```
{
  "resourceType" : "RESOURCETYPE",        ← 410
  "items": [{
      "identifier": {
        "system": "IDSYSTEMCDM",          ← 430
        "value": "IDROW_WID"              ← 440
      },
      "period": {
        "start": "CONSENTSTARTDATE",
        "end": "CONSENTENDDATE"
      },
      "patient": {
        "reference": "CONSENTSPATREFERNCE"
      },
      "consentStatus": {
        "identifier": {
          "system": "CONSENTSTATUSCDM",
          "value": "CONSENTSTATUSROW_WID"
        },
        "status":{
          "coding" : [ {
            "code": "CONSENTSTATUSCODE",
            "display": "CONSENTSTATUSDISPLAY",
            "description": "CONSENTSTATUSDESCRIPTION",
            "sysId": "CONSENTSTATUSSYSID",
            "sysName": "CONSENTSTATUSSYSNAME",
            "sysVersion": "CONSENTSTATUSSYSVERSION"
          }]
        }
      },
      "consentType": {
        "identifier": {
          "system": "CONSENTTYPECDM",
          "value": "CONSENTTYPEROW_WID"
        },
        "type": {
          "coding": [{
            "code": "CONSENTTYPECODE",
            "display": "CONSENTTYPEDISPLAY",
            "description": "CONSENTTYPEDESCRIPTION",
            "sysId": "CONSENTTYPESYSID",
            "sysName": "CONSENTTYPESYSNAME",
            "sysVersion": "CONSENTTYPESYSVERSION"
          }]
        }
      }
  }]
}
```

(Block spanning from "items" through closing `}]` labeled 420)

```
SELECT
450 →  'Consent' as RESOURCETYPE, 'CDM' as IDSYSTEMCDM, a.row_wid IDROW_WID,
       'CDM' as CONSENTSTATUSCDM, b.row_wid as CONSENTSTATUSROW_WID,
       b.CONSENT_STATUS_CODE as CONSENTSTATUSCODE,
       b.CONSENT_STATUS_NAME as CONSENTSTATUSDISPLAY,
       b.CONSENT_STATUS_DESC as CONSENTSTATUSDESCRIPTION,
       b.CONSENT_STATUS_CD_SYS_ID as CONSENTSTATUSSYSID,
       b.CONSENT_STATUS_CD_SYS_NAME as CONSENTSTATUSSYSNAME,
       b.CONSENT_STATUS_CD_SYS_VER as CONSENTSTATUSSYSVERSION,
       'CDM' as CONSENTTYPECDM, c.row_wid as CONSENTTYPEROW_WID,
       c.CONSENT_TYPE_CODE as CONSENTTYPECODE,
       c.CONSENT_TYPE_NAME as CONSENTTYPEDISPLAY,
       c.CONSENT_TYPE_DESC as CONSENTTYPEDEDESCRIPTION,
       c.CONSENT_TYPE_CD_SYS_ID as CONSENTTYPESYSID,
       c.CONSENT_TYPE_CD_SYS_NAME as CONSENTTYPESYSNAME,
       c.CONSENT_TYPE_CD_SYS_VER as CONSENTTYPESYSVERSION,
       to_char(a.CONSENT_START_DT,'MM/DD/YYYY') as CONSENTSTARTDATE,
       to_char(a.CONSENT_END_DT,'MM/DD/YYYY') as CONSENTENDDATE,
       case when a.patient_WID is null then ''
       else ( '/ohfapi/cg/v3.3/patientapi/patients/' || a.PATIENT_WID ) end AS CONSENTSPATREFERNCE
FROM
       w_eha_consent_patient_h a, w_eha_consent_status_d b, w_eha_consent_d c
WHERE
       a.delete_flg='N' AND a.row_wid>0 AND a.CONSENT_STATUS_WID=b.row_wid(+)
470 →  AND a.consent_wid=c.row_wid(+) AND a.patient_wid=##PATIENTWID##
ORDER BY
       a.row_Wid
```

500 →

| Query Criteria | Query Template | Response Template |
|---|---|---|
| CONSENT FOR PATIENT ← 521 | consent.sql | consent.resp |
| LIST OF PATIENT | patientlist.sql | patientlist.resp |
| ... | ... | ... |

| RESOURCETYPE | IDSYSTEMCDM | IDROW_WID | CONSENTSTATUSCDM | ... | CONSENTENDDATE | CONSENTSPATREFERENCE |
|---|---|---|---|---|---|---|
| Consent ← 561 | CDM | 30013 | CDM | ... | 01/31/1920 | /ohfapi/.../patients/2861 |
| Consent ← 562 | CDM | 30018 | CDM | ... | 01/31/1920 | /ohfapi/.../patients/2861 |
| Consent | CDM | 30023 | CDM | ... | 01/31/1920 | /ohfapi/.../patients/28612 |
| Consent | CDM | 30029 | CDM | ... | 01/31/1920 | /ohfapi/.../patients/2861 |
| ... | ... | ... | ... | ... | ... | ... |

*FIG. 5B*

```
{
  "resourceType" : "Consent",        ← 610
  "items" : [ {
    "identifier" : {
      "system" : "CDM",              ← 630A
      "value" : "30013"              ← 640A
    },
    "period" : {
      "start" : "05/05/2010",
      "end" : "12/31/2010"
    },
    "patient" : {
      "reference" : "/ohfapi/cg/v3.3/patientapi/patients/28612"
    },
    "consentStatus" : {
      "identifier" : {
        "system" : "CDM",
        "value" : "553"
      },
      "status" : {
        "coding" : [ {
          "code" : "Bypassed",
          "display" : "Bypassed",
          "description" : "Bypassed",
          "sysId" : "EHA_CUSTOM_CD_SYS",
          "sysName" : "EHA Custom Code System",
          "sysVersion" : "1.0"
        } ]
      }
    },
    "consentType" : {
      "identifier" : {
        "system" : "CDM",
        "value" : "386"
      },
      "type" : {
        "coding" : [ {
          "code" : "PROXY CONSENT ",
          "display" : "It indicates consent given by ....preferably along with police",
          "description" : "Rev knee repl-tibia comp",
          "sysId" : "EHA_CUSTOM_CD_SYS",
          "sysName" : "EHA Custom Code System",
          "sysVersion" : "1.0"
        } ]
      }
    }
  },
  ...
```

(620A brackets the "items" block)

FIG. 6A

```
{
  "identifier" : {
    "system" : "CDM",     ← 630B
    "value" : "30018"     ← 640B
  },
  "period" : {
    "start" : "05/01/2010",
    "end" : "04/30/2011"
  },
  "patient" : {
    "reference" : "/ohfapi/cg/v3.3/patientapi/patients/28612"
  },
  "consentStatus" : {
    "identifier" : {
      "system" : "CDM",
      "value" : "553"
    },
    "status" : {
      "coding" : [ {
        "code" : "Bypassed",
        "display" : "Bypassed",
        "description" : "Bypassed",
        "sysId" : "EHA_CUSTOM_CD_SYS",
        "sysName" : "EHA Custom Code System",
        "sysVersion" : "1.0"
      } ]
    }
  },
  "consentType" : {
    "identifier" : {
      "system" : "CDM",
      "value" : "386"
    },
    "type" : {
      "coding" : [ {
        "code" : "PROXY CONSENT ",
        "display" : "It indicates consent given by ...along with police",
        "description" : "Rev knee repl-tibia comp",
        "sysId" : "EHA_CUSTOM_CD_SYS",
        "sysName" : "EHA Custom Code System",
        "sysVersion" : "1.0"
      } ]
    }
  }
},
... ],
"count" : 44,     ← 650
"hasMore" : false,
"links" : [ {
  "rel" : "self",
  "href" : "http://localhost/ohfapi/cg/v3.3/patientapi/patients/28612/consent"
} ]
}
```

620B (brace encompassing the consent object)

FIG. 6B

```
{
  "resourceType" : "Consent",
  "items" : [ {
    "identifier" : {
      "system" : "CDM",
      "value" : "30013"
    },
    "period" : {
      "start" : "05/05/2010",
      "end" : "12/31/2010"
    },
    "patient" : {
      "reference" : "/ohfapi/cg/v3.3/patientapi/patients/28612"
    },
    "consentStatus" : {
      "identifier" : {
        "system" : "CDM",
        "value" : "553"
      },
      "status" : {
        "coding" : [ {
          "code" : "Bypassed",
          "display" : "Bypassed",
          "description" : "Bypassed",
          "sysId" : "EHA_CUSTOM_CD_SYS",
          "sysName" : "EHA Custom Code System",
          "sysVersion" : "1.0"
        } ]
      }
    },
    "consentType" : {
      "identifier" : {
        "system" : "CDM",
        "value" : "386"
      },
      "type" : {
        "coding" : [ {
          "code" : "INFORMED CONSENT ",
          "display" : "It indicates consent given by ....preferably along with police",
          "description" : "Rev knee repl-tibia comp",
          "sysId" : "EHA_CUSTOM_CD_SYS",
          "sysName" : "EHA Custom Code System",
          "sysVersion" : "1.0"
        } ]
      }
    },
```

710 → (arrow pointing to "code" : "INFORMED CONSENT ")

FIG. 7A

```
{
  "identifier" : {
    "system" : "CDM",
    "value" : "30018"
  },
  "period" : {
    "start" : "05/01/2010",
    "end" : "04/30/2011"
  },
  "patient" : {
    "reference" : "/ohfapi/cg/v3.3/patientapi/patients/28612"
  },
  "consentStatus" : {
    "identifier" : {
      "system" : "CDM",
      "value" : "553"
    },
    "status" : {
      "coding" : [ {
```
720 → `        "code" : "Refused",`
730 → `        "display" : "Refused",`
```
        "description" : "Bypassed",
        "sysId" : "EHA_CUSTOM_CD_SYS",
        "sysName" : "EHA Custom Code System",
        "sysVersion" : "1.0"
      } ]
    }
  },
  "consentType" : {
    "identifier" : {
      "system" : "CDM",
      "value" : "386"
    },
    "type" : {
      "coding" : [ {
        "code" : "PROXY CONSENT ",
        "display" : "It indicates consent given by ...along with police",
        "description" : "Rev knee repl-tibia comp",
        "sysId" : "EHA_CUSTOM_CD_SYS",
        "sysName" : "EHA Custom Code System",
        "sysVersion" : "1.0"
      } ]
    }
  }
},
... ],
 "count" : 42,    ← 740
 "hasMore" : false,
 "links" : [ {
  "rel" : "self",
  "href" : "http://localhost/ohfapi/cg/v3.3/patientapi/patients/28612/consent"
 } ]
}
```

FIG. 7B

VALIDATION OF DATA VALUES CONTAINED IN RESPONSES FROM SERVER SYSTEMS

BACKGROUND OF THE DISCLOSURE

Technical Field

The present disclosure relates to server systems, and more specifically to validation of data values contained in responses from server systems.

Related Art

Server systems refer to digital processing systems which provide responses upon receipt of corresponding requests. The requests may be received from other server systems or client systems (e.g., an end user system providing a user interface). The requests and responses are according to pre-specified conventions such as REST (Representational State Transfer).

Responses contain data values also according to a pre-specified convention. An example of a convention for data values is JSON (JavaScript Object Notation), as is well known in the relevant arts.

There is a general need to validate responses from server systems, in particular data values contained in such responses. Validation refers to confirming that the responses (received from a server system) match corresponding expected responses. Such validation of data values may be performed manually when the responses contain only simple data types (integers, strings, etc.) and very few data values according to such data types.

However, such manual validation approaches may be inadequate in scenarios where responses contain complex data types (e.g., array of records, records embedded in records forming a hierarchy, etc.) and a large number of data values. Aspects of the present disclosure facilitate, among other features, validation of data values contained in responses from server systems.

BRIEF DESCRIPTION OF THE DRAWINGS

Example embodiments of the present disclosure will be described with reference to the accompanying drawings briefly described below.

FIG. 1 is a block diagram illustrating an example environment in which several aspects of the present disclosure can be implemented.

FIG. 2 is a flow chart illustrating the manner in which data values contained in responses from server systems are validated according to an aspect of the present disclosure.

FIG. 4A depicts portions of a response template in an embodiment.

FIG. 4B depicts portions of a query template in an embodiment.

FIG. 5A depicts portions of a template data that indicates a corresponding query template and response template associated with each query criteria in one embodiment.

FIG. 5B depicts portions of data values retrieved directly from a data source in one embodiment.

FIGS. 6A-6B together depicts portions of an expected response in one embodiment.

FIGS. 7A-7B together depict portions of a response received from a server system in one embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 3A:
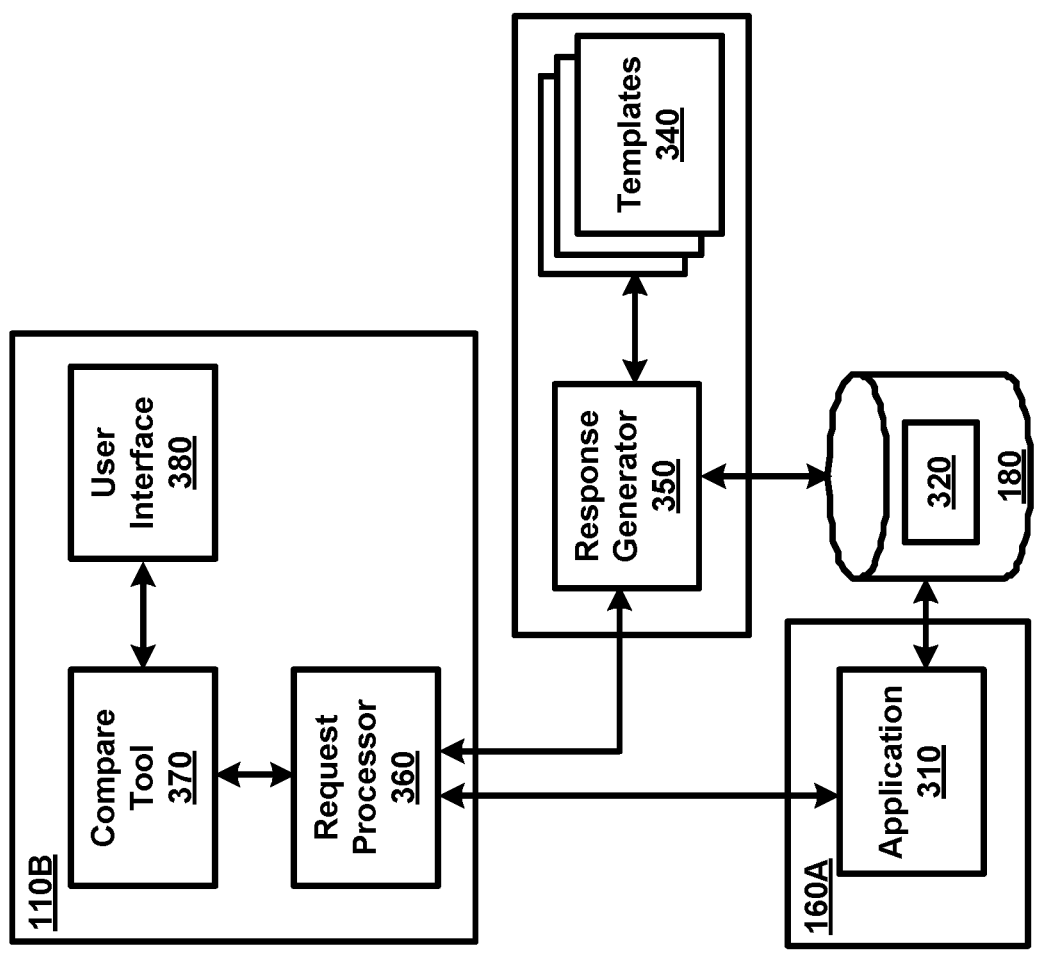
FIG. 3A is a block diagram illustrating the manner in which a client system validates data values contained in a response from a server system in one embodiment.

An aspect of the present disclosure facilitates validation of responses received from server systems. In one embodiment, data values are maintained in a data source. Upon sending a request containing a query criteria to a server system, the server system retrieves data values satisfying the query criteria from the data source. A (actual) response is received from the server system, the actual response containing data values retrieved by the server system. Data values satisfying the query criteria are also retrieved directly from the data source and an expected response is constructed by incorporating the directly retrieved data values. The data values contained in the expected and the actual responses are then compared to determine a difference between the expected and actual responses as a basis for validating the actual response received from the server system for the request.

According to another aspect of the present disclosure, a template data indicating a corresponding query template and response template associated with each query criteria is maintained. Based on the template data, a query template and a response template associated with a query criteria contained in a request are identified. Data values satisfying the query criteria are retrieved directly from a data source by executing a query created based on the identified query template. An expected response is constructed by incorporating the directly retrieved data values in the identified response template.

According to one more aspect of the present disclosure, a response template includes placeholders for data values, with a query template associating a corresponding data value for each of the placeholders. An expected response is constructed by replacing each placeholder of in the response template with the corresponding data value associated with the placeholder.

According to yet another aspect of the present disclosure, a response template contains an indication that a placeholder forming a sub-template can have multiple occurrences in an expected response. Upon determining one or more data values associated with the placeholder, multiple occurrences of the sub-template corresponding to the one or more data values are iteratively generated. The expected response is then constructed by including the multiple occurrences of the sub-template in the expected response.

According to an aspect of the present disclosure, a client system sends a request to the server system and receives a (actual) response. The client system further sends the same request to a validation system which in turn performs the actions of directly retrieving data values from a data source, constructing an expected response and then sends the expected response to the client system. The client system receives the expected response and performs the comparing of the data values contained in the expected response and the actual response.

According to another aspect of the present disclosure, a client system sends a validation request for a request to a validation system, with the validation system then performing the actions of sending the request to a server system, receiving a (actual) response from the server system, retrieving directly data values from a data source, constructing an expected response from the directly retrieved data values and comparing the data values in the expected and actual responses. The validation system then sends to the client system, a result of the comparing as a response to the validation request.

In one embodiment, the request, (actual) response from a server system, and the expected response is according to REST (Representational State Transfer) architecture, with the data values contained in the actual and expected responses being organized according to JSON (JavaScript Object Notation).

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating an example environment (computing system) in which several aspects of the present invention can be implemented. The block diagram is shown containing client systems 110A-110Z, Internet 120, intranet 140, validation system 150, server systems 160A-160C and data store 180.

Merely for illustration, only representative number/type of systems is shown in FIG. 1. Many environments often contain many more systems, both in number and type, depending on the purpose for which the environment is designed. Each block of FIG. 1 is described below in further detail.

Intranet 140 represents a network providing connectivity between validation system 150, server systems 160A-160C and data store 180, all provided within an enterprise (as indicated by the dotted boundary). Internet 120 extends the connectivity of these (and other systems of the enterprise) with external systems such as client systems 110A-110Z. Each of intranet 140 and Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by Internet 120 and intranet 140. When the packet contains content such as port numbers, which specifies a target application, the packet may be said to be directed to such application as well.

Data store 180 represents a non-volatile (persistent) storage facilitating storage and retrieval of enterprise data by applications executing in validation system 150 and server systems 160A-160C. Data store 180 may be implemented as a corresponding database server using relational database technologies and accordingly provide storage and retrieval of data using structured queries such as SQL (Structured Query Language). Alternatively, data store 180 may be implemented as a corresponding file server providing storage and retrieval of data in the form of files organized as one or more directories, as is well known in the relevant arts.

Each of client systems 110A-110Z represents a system such as a personal computer, workstation, mobile device, computing tablet etc., used by users to generate (client) requests directed to enterprise applications executing in validation system 150 and server system 160A-160C. The client requests may be generated using appropriate user interfaces (e.g., web pages provided by an enterprise application executing in a server system, a native user interface provided by a portion of an enterprise application downloaded from server systems, etc.).

In general, a client system requests an enterprise application for performing desired tasks and receives the corresponding responses (e.g., web pages) containing the results of performance of the requested tasks. The web pages/responses may then be presented to the user by the client applications such as the browser. Each client request is sent in the form of an IP packet directed to the desired server system or enterprise application, with the IP packet including data identifying the desired tasks in the payload portion.

In one embodiment, the client requests and corresponding responses are according to REST (Representational State Transfer) architecture, well known in the relevant arts. The client requests and corresponding responses contain data values also according to a pre-specified convention. An example of a convention for data values is JSON (JavaScript Object Notation), well known in the relevant arts.

Each of validation system 150 and server systems 160A-160C represents a server, such as a web/application server, executing enterprise applications capable of performing tasks requested by users using one of client systems 110A-110Z. A server system receives a client request from a client system and performs the tasks requested in the client request. A server system may use data stored internally (for example, in a non-volatile storage/hard disk within the server system), external data (e.g., maintained in data store 180) and/or data received from external sources (e.g., from the user) in performing the requested tasks. The server system then sends the result of performance of the tasks to the requesting client system (one of 110A-110Z) as a corresponding response to the client request. The results may be accompanied by specific user interfaces (e.g., web pages) for displaying the results to the requesting user.

As noted in the Background section, there is a general need to validate responses received from server systems (160A-160C), in particular data values contained in such responses. The manner in which several features of the present disclosure facilitate the validation of data values contained in responses received from server systems 160A-160C is described below with examples.

3. Validation of Data Values Contained in Responses from Server Systems

FIG. 2 is a flow chart illustrating the manner in which validation of data values contained in responses from server systems is performed according to an aspect of the present disclosure. The flowchart is described with respect to the systems of FIG. 1, merely for illustration. However, many of the features can be implemented in other environments also without departing from the scope and spirit of several aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, a data source containing data values is maintained. The data source may be a database/table maintained in data store 180 (implemented as a database server using relational database technologies). Alternatively, the data source may be one or more files maintained in data store 180 (when implemented as a file server).

In step 220, a request is sent containing a query criteria to a server system, with the server system retrieving data values satisfying the query criteria (result set) from the data source. The request may be sent by one of client systems 110A-110Z or validation system 150 to one of server systems 160A160C. The query criteria typically specify one or more conditions that need to be satisfied by data values for inclusion in the result set. The receiving server system (assumed to be 160A, for illustration) accordingly retrieves data values satisfying the conditions of the query criteria from the data source (180). Server system 160A may issue appropriate queries (e.g. SQL queries) to data source (180) for the retrieval of the data values satisfying the query criteria.

In step 230, a (actual) response is received from the server system containing the data values retrieved by the server system (160A). The response may be received by the requesting client system (110A-110Z).

In step 250, data values satisfying the query criteria are retrieved directly from the data source (180). The term "directly" implies that the data values are retrieved from the data source without relying on any intermediate entities (such as server system 160A) for retrieval and forwarding. Thus, when the data values are retrieved, any intermediate machines (such as routers) merely passively forward the data values. The data values may be retrieved directly by sending appropriate queries (e.g. SQL queries) to data source (180). It should be appreciated that the queries for directly retrieving the data values may be similar to or different from the queries issued by the server system (160A).

In step 270, an expected response by incorporating the directly retrieved data values is constructed. The expected response may be constructed in a known way. According to an aspect of the present disclosure, a response template includes placeholders for data values, with a query template associating a corresponding data value for each of the placeholders. An expected response is constructed by replacing each placeholder of in the response template with the corresponding data value associated with the placeholder.

In step 280, the data values contained in the expected and actual responses is compared to determine a difference between the expected and actual response as a basis for validating the actual response received from the server system (160A) for the request (sent in step 210). Specifically, the actual response is deemed to be valid/accurate if the comparison indicates that all of the data values contained in the expected response matches the corresponding data values contained in the actual response, and deemed to be invalid/inaccurate otherwise. The flowchart ends in step 299.

Upon determining that an actual response received from a server system (160A) is invalid, a developer and/or an administrator of the server system may be notified of the error, thereby facilitating the error to be rectified. In addition, the operation of the flowchart of FIG. 2 facilitates a large number of responses to be validated in a short duration, without any manual intervention.

It may be appreciated that the features of the present disclosure may be implemented using the various systems of FIG. 1. The manner in which validation of data values contained in responses from server systems is implemented in different embodiments is described below with examples.

4. Example Implementations

Figure 3B:
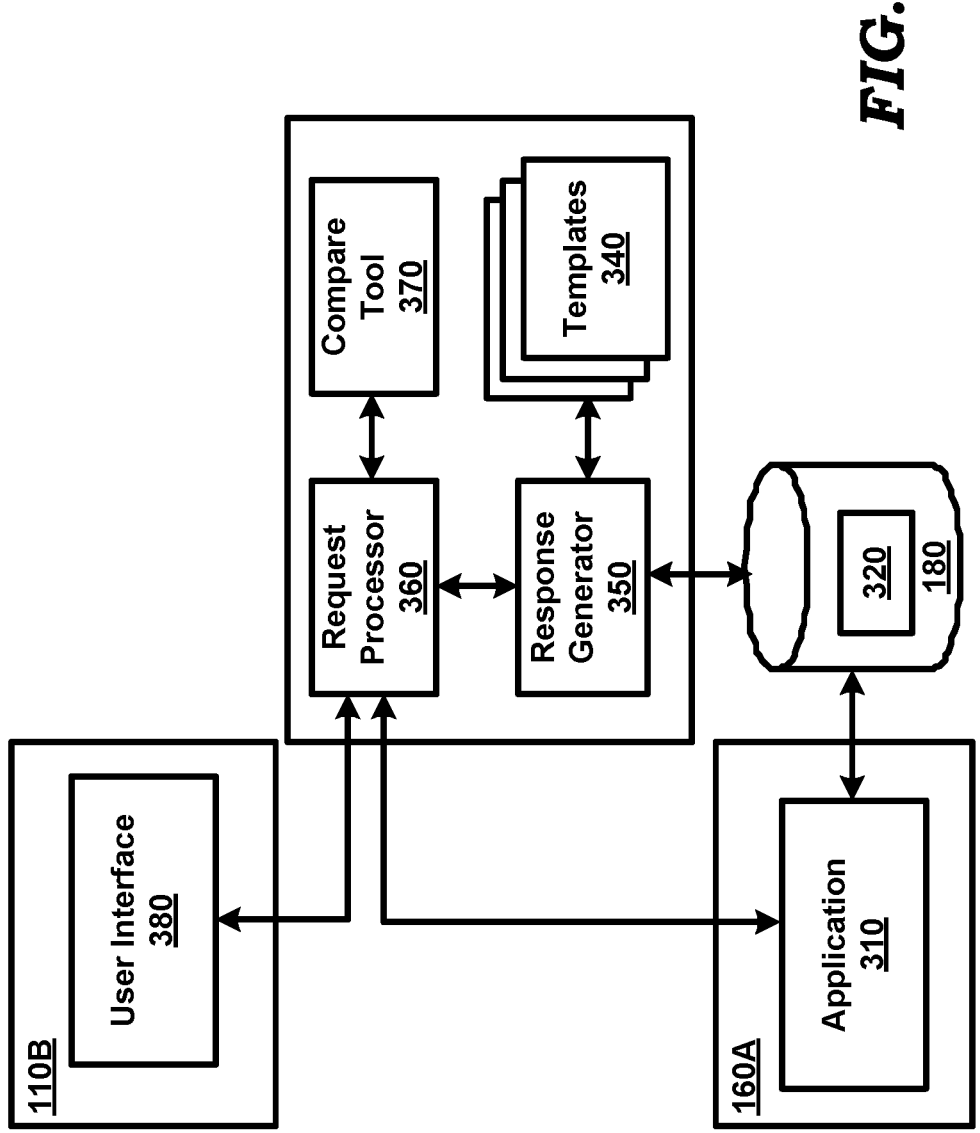
FIG. 3B is a block diagram illustrating the manner in which a validation system validates data values contained in a response from a server system in one embodiment.

Broadly, FIG. 3A illustrates the manner in which a client system validates data values contained in a (actual) response received from a server system, while FIG. 3B illustrates the manner in which a validation system validates data values contained in the actual response. For illustration, the description below is provided with respect to client system 110B, server system 160A and validation system 150. However, the feature of the present disclosure may be similarly implemented in any one of client systems 110A-110Z and/or server systems 160A-160C, as will be apparent to one skilled in the relevant arts by reading the disclosure herein.

Each of FIGS. 3A and 3B is shown containing (enterprise) application 310, source data 320, templates 340, response generator 350, request processor 360, compare tool 370 and user interface (UI) 380. Each of the blocks is described in detail below.

Enterprise application 310 executing in server system 160A performs tasks requested by users using one of client systems 110A-110Z. Application 310 receives a client request from client system 110B, performs the tasks requested in the client request and sends the results of performance of the tasks as a corresponding response to the client request.

Source data 320 (maintained in data store 180) represents the data based on which application 310 performs the requested tasks. Source data 320 contains data values that may be retrieved by application 310 and sent as part of the response to a client request received from client system 110B. In the following description, it is assumed that source data 320 is a table maintained in data store 180 (implemented as a database server using relational database technologies).

Templates 340 (maintained in validation system 150) represent pre-defined data samples that may be used as the basis for building the desired data. A template, typically in the form of a file, contains pre-defined structures and data values. The template may thereafter be adapted, for example, by adding/completing the structures/data values, removing or changing some of the structures/data values, etc. to form the desired data (file/document).

According to an aspect of the present disclosure, templates 340 include query templates and response templates.

Query templates are used to generate one or more SQL queries for retrieving data values (satisfying desired query criteria) from source data 320. Response templates are used for constructing expected responses by incorporation of data values retrieved from source data 320.

Response generator 350, executing in validation system 150, constructs expected responses based on templates 340. Upon receiving a request containing a query criteria, response generator 350 identifies a query template and a response template (of templates 340) that are associated with the query criteria. In one embodiment, the identification is performed based on a template data (shown in FIG. 5A) that indicates a corresponding query template and response template associated with each query criteria. Alternatively, the query/response templates may be named consistent with the query criteria, with response generator 350 determining the specific templates based on such a naming convention.

Response generator 350 first creates one or more SQL queries based on the identified query template and then executes the created queries on source data 320 to directly retrieve data values satisfying the query criteria. Response generator 350 then constructs an expected response by incorporating the directly retrieved data values in the identified response template.

Request processor 360 facilitates validation of responses according to aspects of the present disclosure. Upon receiving a request containing a query criteria, request processor 360 sends the request to application 310 and receives a (actual) response from application 310, the actual response containing data values retrieved from source data 320. Request processor 360 also sends the request to response generator 350 and receives an expected response from response generator 350, the expected response containing data values directly retrieved from source data 320.

Request processor 360 then forwards the actual and expected responses to compare tool 370. In one embodiment, prior to forwarding to compare tool 370, request processor 360 also checks whether a (actual) response code received as part of the actual response matches an expected response code determined as part of constructing of the expected response. Request processor 360 then forwards the status (match or mismatch) of comparison of the actual and expected response codes along with the actual and expected responses to compare tool 370.

Compare tool 370 facilitates the comparison of the structure and data values contained in the actual and expected responses. Comparison tool 370 may be a third-party file or data comparison tool such as WinDiff available from Microsoft™ Corporation. Compare tool 370 provides the results of the comparison as part of user interface 380. Compare tool 370 may also the status of comparison of the response codes as part of user interface 380. User interface 380 represents a portion of an interface displayed on a display unit (not shown) associated with client system 110B.

It may be appreciated that the various components described above may operate together to facilitate a client system (110B) or validation system 150 to validates data values contained in an actual response received from a server system (160A).

Referring to FIG. 3A, request processor 360, shown executing in client system 110B, receives an indication from a user to validate the response to a request containing a query criteria. In response to the indication, request processor 360 sends the request to application 310 executing in server system 160A and receives a (actual) response containing data values retrieved from source data 320 by application 310. Request processor 360 further sends the same request to response generator 350 executing in validation system 150. Response generator 350 in turn performs the actions of directly retrieving data values from source data 320 and constructing an expected response based on query and response templates contained in templates 340. Response generator 350 then sends the expected response to request processor 360 executing in client system 110B. Request processor 360 receives the expected response and forwards it to compare tool 370 executing in client system 110B, which in turn performs the comparison of the data values contained in the expected response and the actual response, and provides the results of comparison on UI 380.

Referring to FIG. 3B, a user using (UI 380 of) client system 110B sends a validation request for a request (containing a query criteria) to request processor 360 executing in validation system 150. Request processor 360, then sends the request to application 310 executing in server system 160A and receives a (actual) response from application 310. Request processor 360 also forwards the same request to response generator 360, which in turn constructs an expected response from data values directly retrieved from source data 320 and the query and response templates of templates 340. Request processor 360 receives the expected response from response generator 350 and then forwards the actual and expected response to compare tool 370 executing in validation system 150. Request processor 360 also receives the result of comparison from compare tool 370 and forwards the results to UI 380 shown in client system 110B.

Thus, a user is facilitated to perform validation of data values contained in responses from server systems. As noted above, in one embodiment, the requests and responses are according to REST architecture, with the data values contained in the requests and responses being according to JSON convention/format. Accordingly, the manner in which the validation is performed for a REST request by the operation of the various components of FIGS. 3A and 3B is described in detail below.

5. Illustrative Example

FIGS. 4A-4B, 5A-5B, 6A-6B, 7A-7B and 8 together illustrate the manner in which validation of data values contained in a response to a REST request is performed in one embodiment. For illustration, the REST request is assumed to have the Uniform Resource Locator (URL) of "www.acme.com/ohfapi/patients/28612/consent" and the type of operation as "GET", indicating that the REST request is for getting a list of consents provided for patient having the unique identifier 28612. The REST request accordingly specifies the query criteria "CONSENT FOR PATIENT" with the patient identifier 28612.

Upon receiving the REST request, request processor 360 sends the REST request to application 310 via Internet 120/intranet 140. It is assumed that the URL portion "www.acme.com/ohfapi" corresponds to the URL of application 310 and according causes the REST request to be sent to application 310 by operation of Internet 120/intranet 140. Request processor 360 then receives a (actual) response from application 310 containing data values according to JSON (portions shown in FIGS. 7A-7B).

Request processor 360 also sends the REST request to response generator 350 which in turn constructs an expected response for the REST request. Response generator 350 first inspects templates 340 for identifying query and response templates corresponding to the query criteria contained in the REST request. A sample response and query template maintained as part of templates 340 is described in detail below.

FIG. 4A depicts portions of a response template (of templates 340) in one embodiment. The response template is similar to JSON, but with placeholders for data values. As is well known, a placeholder is a text/string that is used to indicate where a corresponding data value is to be incorporated into the template by replacing the text/string with the corresponding data value.

For example, lines 410, 430 and 440 respectively contain the placeholders RESOURCETYPE, IDSYSTEMCDM and IDROW_WID. Similarly, other lines of the response template are shown containing other placeholders. The response template also contains an indication (opening square bracket) that a placeholder (IDROW_WID) forming a sub-template (data portion 420 between the opening square bracket and the corresponding closing square bracket) can have multiple occurrences in the expected response.

FIG. 4B depicts portions of a query template (of templates 340) in one embodiment. The query template is similar to an SQL query, but with placeholders for query values. For example, line 470 contains the placeholder ##PATIENTWID##. It may be readily observed that the SQL query of FIG. 4B is designed to retrieve data values directly from source data 320 and associate each retrieved data value to a corresponding placeholder (by usage of the "as" SQL keyword). For example, line 450 is designed to retrieve data values associated with the placeholders RESOURCETYPE, IDSYSTEMCDM and IDROW_WID. Similarly, the other lines in the SQL query are designed to retrieved data values associated with other placeholders in the response template of FIG. 4A.

The manner in which an expected response is constructed based on the response template of FIG. 4A and the query template of FIG. 4B is described in detail below.

6. Constructing Expected Response

Referring again to FIGS. 3A-3B, response generator 350 inspects templates 340 and identifies a query template and a response template that are associated with the query criteria "CONSENT FOR PATIENT". As noted above, in one embodiment, the identification is performed based on a template data described below with examples.

FIG. 5A depicts portions of a template data that indicates a corresponding query template and response template associated with each query criteria in one embodiment. Though shown maintained in the form of a table (in data store 180), the template data may be maintained according to other data formats (such as extensible markup language (XML), etc.) and/or using other data structures (such as lists, trees, etc.), as will be apparent to one skilled in the relevant arts by reading the disclosure herein.

Table 500 depicts a portion of template data. Specifically, column "Query Criteria" specifies unique query criteria that may be contained in a REST request, with columns "Query Template" and "Response Template" respectively specifying the names of the query and response templates associated with the unique query criteria. Each row of table 500 accordingly indicates the query and response templates associated with each query criteria.

Referring again to FIGS. 3A-3B, response generator 350 examines table 500 and identifies the query template named "consent.sql" and the response template "consent.resp" as being associated with query criteria "CONSENT FOR PATIENT" (row 521 of table 500). In the following description, it is assumed that the response template "consent.resp" contains the portions shown in FIG. 4A, while the query template "consent.sql" contains the portions shown in FIG. 4B.

Response generator 350 then creates an SQL query based on the identified query template of FIG. 4B by replacing the placeholder ##PATIENTWID## with the query value 28612, and then executes the created query on source data 320 to directly retrieve data values satisfying the query criteria.

FIG. 5B depicts portions of data values retrieved directly from a data source (source data 320) in one embodiment. Table 550 is shown containing columns such as RESOURCETYPE, IDSYSTEMCDM, IDROW_WID, etc. corresponding to the placeholders in the response template of FIG. 4A. Each of rows of table 550 contains data values satisfying the query criteria specified in the SQL query (and correspondingly specified in the REST request).

Referring again to FIGS. 3A-3B, response generator 350 then constructs an expected response by incorporating the directly retrieved data values of table 550 in the response template of FIG. 4A. Specifically, response generator 350 replaces the placeholders such as RESOURCETYPE, IDSYSTEMCDM, IDROW_WID, etc. in the response template with corresponding data values "Consent", "CDM", "30013", etc. (as shown in row 561).

In the scenario that the response template contains an indication that a placeholder IDROW_WID forming a sub-template (data portion 420) can have multiple occurrences in an expected response, response generator 350 determines whether one or more data values are associated with the placeholder and then iteratively generates multiple occurrences of the sub-template corresponding to the one or more data values. For the data values of table 550, response generator 350 determines that placeholder IDROW_WID (that is column IDROW_WID) has multiple values such as "30013", "30018", etc. and accordingly generates multiple occurrences of the sub-template data portion 420. Report generator 350 then includes the multiple occurrences in the expected response constructed for the query criteria.

In one embodiment, response generator 350 also finds (null) placeholders in the response template that do not have any associated data value. If any such null placeholder is found, response generator 350 the null placeholder and associated template portion are not included in the final constructed expected response. For example, the placeholder IDSYSTEMCDM is associated with the template portion shown in line 430, and accordingly if IDSYSTEM-CDM is determined to be a null placeholder, the placeholder and the template portion (that is the whole of line 430) is not included in the expected response.

An expected response constructed based on the data of FIG. 5B and the comparing of the expected response with an actual response received from application 100 is described below with examples.

7. Comparing Expected Response and Actual Response

FIGS. 6A-6B together depict portions of an expected response constructed for a query criteria by incorporating data values directly retrieved from a data source in one embodiment. Specifically, FIGS. 6A-6B depicts portions of the expected response constructed by response generator 350 for the query criteria "CONSENT FOR PATIENT"

based on the response template of FIG. 4A, and incorporating the data values retrieved based on the query template of FIG. 4B.

It may be readily observed that lines 610, 630A and 630B have been constructed by replacing the placeholders RESOURCETYPE, IDSYSTEMCDM, and IDROW_WID in lines 410, 430 and 440 of FIG. 4A, with the corresponding data values retrieved from source data 320, in particular, the values of the corresponding columns in row 561 of FIG. 5B. In addition, it may be observed that the sub-template of data portion 420 of FIG. 4A has been generated and included as multiple occurrences 620A, 620B, etc. corresponding to rows 561 and 562 of table 550 of FIG. 5B. Specifically, lines 630B and 640B specify the values of the corresponding columns in row 562 of FIG. 5B. Line 650 indicates that there are 44 items (occurrences of data portion 420) in the expected response.

FIG. 7A-7B together depicts portions of a (actual) response received from a server system in one embodiment. Specifically, FIGS. 7A-7B depicts portions of the actual response received from application 310 in response to the REST request, with the actual response containing data values satisfying the query criteria "CONSENT FOR PATIENT" retrieved from source data 320 by application 100. It may be observed that in lines 710, 720, 730 and 740, the actual response contains data values that do not match the corresponding data values in the expected response of FIGS. 6A-6B.

Referring again to FIGS. 3A-3B, response generator 350 forwards/sends the constructed expected response of FIGS. 6A-6B to request processor 360. Request processor 360 then forwards the expected response of FIGS. 6A-6B along with the actual response of FIGS. 7A-7B to compare tool 370. Compare tool 370 compares the data values in the expected and actual responses and provides the results of comparison on UI 380. A sample user interface providing the results of comparison is described in detail below.

Figure 8:
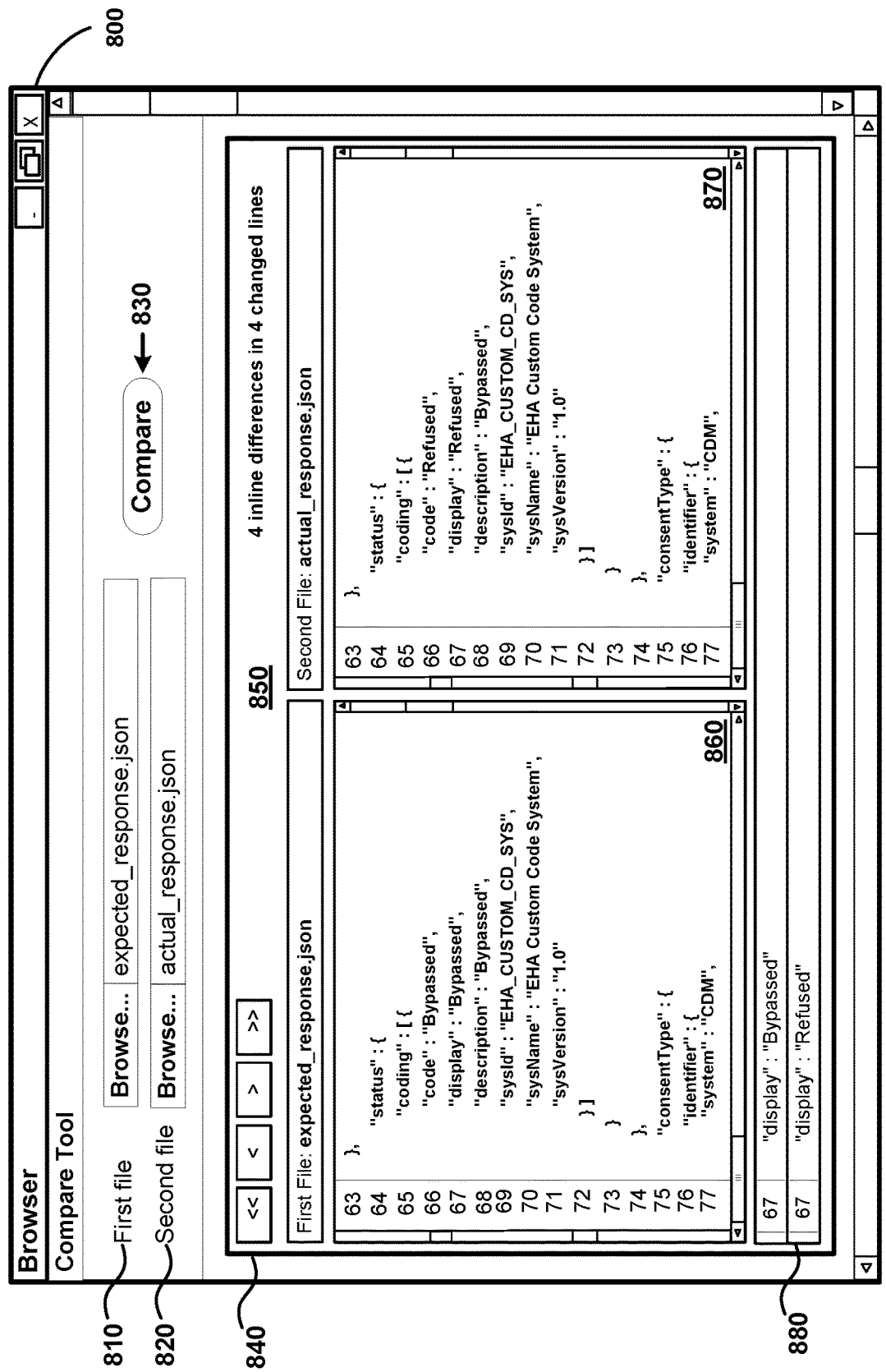
FIG. 8 depicts a sample user interface for providing the results of comparison of data values contained in expected and actual response in one embodiment.

FIG. 8 depicts a sample user interface for providing the results of comparison of data values contained in expected and actual response in one embodiment. Display area 800 represents a portion of a user interface displayed on a display unit (not shown) associated with client system 110B. In one embodiment, display area 800 corresponds to a web page rendered by a browser executing on client system 110B, with the web page being provided by compare tool 370.

Display areas 810 and 820 facilitate the user to select the desired first and second files to be compared. The user is shown having selected the two files "expected_response.json" (assumed to contain the portions shown in FIGS. 6A-6B) and "actual_response.json" (assumed to contain the portions shown in FIGS. 7A-7B). The user may then select button 830 "Compare" to cause the comparison of the two files.

Display area 840 depicts the result of comparison of the files selected in display areas 810 and 820. Display area 850 indicates the number of differences (4) between the two responses corresponding to the different data values in lines 710, 720, 730 and 740 of the actual response of FIGS. 7A-7B. It may be appreciated that the display of number of differences as 0 implies that the data values in the actual and expected responses are the same. In other words, the data values contained in the actual response from the server system are valid if the number of differences is 0, and is invalid other wise.

Display area 850 also contains navigation buttons that enable the user to navigate to any specific difference. It is assumed that the user has navigated to the difference shown in line 730 of FIGS. 7A-7B. Display area 860 displays the portion of the first file "expected_response.json" corresponding to the difference to which the user has navigated, while display area 870 displays the portion of the second file "actual_response.json" corresponding to the difference to which the user has navigated. Display area 880 displays the specific line from the first file (top row) and the specific line from the second file (bottom row) corresponding to the difference to which the user has navigated.

Thus, a user is facilitated to perform the validation of data values contained in response from server system. As noted above, if a response is determined to be invalid, a developer and/or an administrator of the server system may be notified of the error, thereby facilitating the error to be rectified.

It should be appreciated that the features described above can be implemented in various embodiments as a desired combination of one or more of hardware, software, and firmware. The description is continued with respect to an embodiment in which various features are operative when the software instructions described above are executed.

8. Digital Processing System

Figure 9:
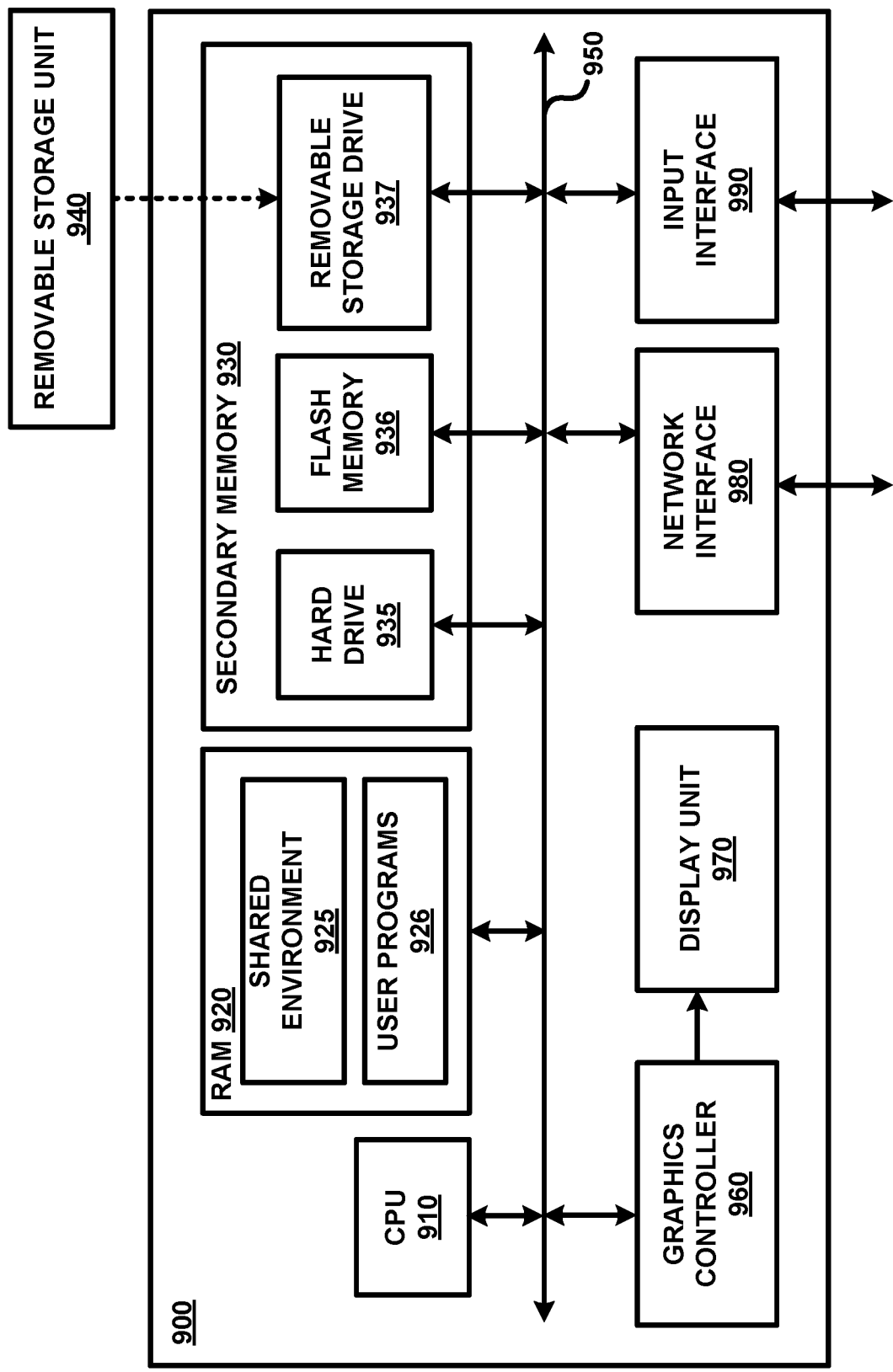
FIG. 9 is a block diagram illustrating the details of a digital processing system in which various aspects of the present disclosure are operative by execution of appropriate executable modules.

FIG. 9 is a block diagram illustrating the details of digital processing system 900 in which various aspects of the present disclosure are operative by execution of appropriate executable modules. Digital processing system 900 may correspond to any one of client systems 110A-110Z or validation system 150.

Digital processing system 900 may contain one or more processors such as a central processing unit (CPU) 910, random access memory (RAM) 920, secondary memory 930, graphics controller 960, display unit 970, network interface 980, and input interface 990. All the components except display unit 970 may communicate with each other over communication path 950, which may contain several buses as is well known in the relevant arts. The components of FIG. 9 are described below in further detail.

CPU 910 may execute instructions stored in RAM 920 to provide several features of the present disclosure. CPU 910 may contain multiple processing units, with each processing unit potentially being designed for a specific task. Alternatively, CPU 910 may contain only a single general-purpose processing unit.

RAM 920 may receive instructions from secondary memory 930 using communication path 950. RAM 920 is shown currently containing software instructions constituting shared environment 925 and/or other user programs 926 (such as other applications, DBMS, etc.). In addition to shared environment 925, RAM 920 may contain other software programs such as device drivers, virtual machines, etc., which provide a (common) run time environment for execution of other/user programs.

Graphics controller 960 generates display signals (e.g., in RGB format) to display unit 970 based on data/instructions received from CPU 910. Display unit 970 contains a display screen to display the images defined by the display signals (for example, the portions of the user interfaces shown in FIG. 8). Input interface 990 may correspond to a keyboard and a pointing device (e.g., touch-pad, mouse) and may be used to provide inputs (for example, the inputs associated with the user interfaces shown in FIG. 8). Network interface 980 provides connectivity to a network (e.g., using Internet Protocol), and may be used to communicate with other systems (of FIG. 1) connected to the networks (120 and 140).

Secondary memory 930 may contain hard drive 935, flash memory 936, and removable storage drive 937. Secondary memory 930 may store the data (for example, portions of the data shown in FIGS. 4A-4B, 5A-5B, 6A-6B and 7A-7B) and software instructions (for example, for implementing the various features of the present disclosure as shown in FIG. 2, etc.), which enable digital processing system 900 to provide several features in accordance with the present disclosure. The code/instructions stored in secondary memory 930 may either be copied to RAM 920 prior to execution by CPU 910 for higher execution speeds, or may be directly executed by CPU 910.

Some or all of the data and instructions may be provided on removable storage unit 940, and the data and instructions may be read and provided by removable storage drive 937 to CPU 910. Removable storage unit 940 may be implemented using medium and storage format compatible with removable storage drive 937 such that removable storage drive 937 can read the data and instructions. Thus, removable storage unit 940 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 940 or hard disk installed in hard drive 935. These computer program products are means for providing software to digital processing system 900. CPU 910 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 930. Volatile media includes dynamic memory, such as RAM 920. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 950. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

9. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

What is claimed is:

1. A computer implemented method of validating responses from application server systems, said method comprising:
    maintaining in a database server, a data source containing data values;
    sending a first request containing a query criteria to an application server system, wherein said application server system retrieves, by issuing a first structured query to said database server upon receipt of said first request, a first plurality of data values satisfying said query criteria from said data source;
    receiving a first response to said first request from said application server system, wherein said application server system forms said first response to include said first plurality of data values;
    retrieving directly from said data source, by issuing a second structured query to said database server without relying on said application server system, a second plurality of data values satisfying said query criteria of said first request, wherein said database server provides said second plurality of data values as a second response to said second structured query;
    constructing an expected response to said first request by incorporating said second plurality of data values of said second response; and
    comparing said first plurality of data values of said first response and said second plurality of data values of said expected response to determine a difference between said expected response and said first response as a basis for validating said first response received from said application server system for said first request,
    wherein both of said first request and said second structured query are issued due to a requirement to validate responses from said application server system.

2. The computer implemented method of claim 1, further comprising:
    maintaining a template data indicating a corresponding query template and response template associated with each query criteria;
    identifying based on said template data, a first query template and a first response template associated with said query criteria of said first request,
    wherein said retrieving directly retrieves, by interfacing with said database server, said second plurality of data values by executing a first query created based on said first query template on said data source,
wherein said constructing constructs said expected response by incorporating said second plurality of data values into said first response template.

3. The computer implemented method of claim 2, wherein said first response template includes a first plurality of placeholders for data values,
wherein said first query template associates a corresponding data value for each of said first plurality of placeholders,
wherein said constructing comprises replacing each placeholder of said first plurality of placeholders in said first response template with said corresponding data value associated with the placeholder.

4. The computer implemented method of claim 3, wherein said first response template contains an indication that a first placeholder of said first plurality of placeholders forming a sub-template can have multiple occurrences in said expected response, said method further comprising:
determining one or more data values of said second plurality of data values associated with said first placeholder;
iteratively generating said multiple occurrences of said sub-template corresponding to said one or more data values,
wherein said constructing comprises including said multiple occurrences of said sub-template in said expected response.

5. The computer implemented method of claim 1, wherein a client system sends said first request to said application server system and receives said first response,
wherein said client system further sends said first request to a validation system which in turn performs said retrieving and said constructing, said validation system then sending said expected response to said client system,
wherein said client system receives said expected response and performs said comparing,
wherein said validation system is implemented separate from said client system.

6. The computer implemented method of claim 1, wherein a client system sends a validation request for said first request to a validation system,
said validation system performing said sending, said receiving, said retrieving, said constructing and said comparing,
said validation system sending to said client system, a result of said comparing as a response to said validation request,
wherein said validation system is implemented separate from said client system.

7. The computer implemented method of claim 1, wherein each of said first request, first response, and said expected response is according to REST (Representational State Transfer) architecture,
wherein said first plurality of data values and said second plurality of data values are organized according to JSON (JavaScript Object Notation).

8. A non-transitory machine readable medium storing one or more sequences of instructions for validating responses from application server systems, wherein execution of said one or more instructions by one or more processors causes said one or more processors to perform the actions of:
maintaining in a database server, a data source containing data values;
sending a first request containing a query criteria to an application server system, wherein said application server system retrieves, by issuing a first structured query to said database server upon receipt of said first request, a first plurality of data values satisfying said query criteria from said data source;
receiving a first response to said first request from said application server system, wherein said application server system forms said first response to include said first plurality of data values;
retrieving directly from said data source, by issuing a second structured query to said database server without relying on said application server system, a second plurality of data values satisfying said query criteria of said first request, wherein said database server provides said second plurality of data values as a second response to said second structured query;
constructing an expected response to said first request by incorporating said second plurality of data values of said second response; and
comparing said first plurality of data values of said first response and said second plurality of data values of said expected response to determine a difference between said expected response and said first response as a basis for validating said first response received from said application server system for said first request,
wherein both of said first request and said second structured query are issued due to a requirement to validate responses from said application server system.

9. The non-transitory machine readable medium of claim 8, further comprising one or more instructions for:
maintaining a template data indicating a corresponding query template and response template associated with each query criteria;
identifying based on said template data, a first query template and a first response template associated with said query criteria of said first request,
wherein said retrieving directly retrieves, by interfacing with said database server, said second plurality of data values by executing a first query created based on said first query template on said data source,
wherein said constructing constructs said expected response by incorporating said second plurality of data values into said first response template.

10. The non-transitory machine readable medium of claim 9, wherein said first response template includes a first plurality of placeholders for data values,
wherein said first query template associates a corresponding data value for each of said first plurality of placeholders,
wherein said constructing comprises one or more instructions for replacing each placeholder of said first plurality of placeholders in said first response template with said corresponding data value associated with the placeholder.

11. The non-transitory machine readable medium of claim 10, wherein said first response template contains an indication that a first placeholder of said first plurality of placeholders forming a sub-template can have multiple occurrences in said expected response, further comprising one or more instructions for:
determining one or more data values of said second plurality of data values associated with said first placeholder;

iteratively generating said multiple occurrences of said sub-template corresponding to said one or more data values,
wherein said constructing comprises one or more instructions for including said multiple occurrences of said sub-template in said expected response.

12. The non-transitory machine readable medium of claim 8, wherein a client system sends said first request to said application server system and receives said first response,
wherein said client system further sends said first request to a validation system which in turn performs said retrieving and said constructing, said validation system then sending said expected response to said client system,
wherein said client system receives said expected response and performs said comparing,
wherein said validation system is implemented separate from said client system.

13. The non-transitory machine readable medium of claim 8, wherein a client system sends a validation request for said first request to a validation system,
said validation system performing said sending, said receiving, said retrieving, said constructing and said comparing,
said validation system sending to said client system, a result of said comparing as a response to said validation request,
wherein said validation system is implemented separate from said client system.

14. The non-transitory machine readable medium of claim 8, wherein each of said first request, first response, and said expected response is according to REST (Representational State Transfer) architecture,
wherein said first plurality of data values and said second plurality of data values are organized according to JSON (JavaScript Object Notation).

15. A system comprising:
one or more processors; and
one or more random access memories (RAM) to store instructions, wherein said one or more processors retrieve said instructions and execute said instructions, wherein execution of said instructions causes said system to perform the actions of:
maintaining in a database server, a data source containing data values;
sending a first request containing a query criteria to an application server system, wherein said application server system retrieves, issuing a first structured query to said database server upon receipt of said first request, a first plurality of data values satisfying said query criteria from said data source;
receiving a first response to said first request from said application server system, wherein said application server system forms said first response to include said first plurality of data values;
retrieving directly from said data source, by issuing a second structured query to said database server without relying on said application server system, a second plurality of data values satisfying said query criteria of said first request, wherein said database server provides said second plurality of data values as a second response to said second structured query;
constructing an expected response to said first request by incorporating said second plurality of data values of said second response; and
comparing said first plurality of data values of said first response and said second plurality of data values of said expected response to determine a difference between said expected response and said first response as a basis for validating said first response received from said application server system for said first request,
wherein both of said first request and said second structured query are issued due to a requirement to validate responses from said application server system.

16. The system of claim 15, further performing the actions of:
maintaining a template data indicating a corresponding query template and response template associated with each query criteria;
identifying based on said template data, a first query template and a first response template associated with said query criteria of said first request,
wherein said retrieving directly retrieves, by interfacing with said database server, said second plurality of data values by executing a first query created based on said first query template on said data source,
wherein said system constructs said expected response by incorporating said second plurality of data values into said first response template.

17. The system of claim 16, wherein said first response template includes a first plurality of placeholders for data values,
wherein said first query template associates a corresponding data value for each of said first plurality of placeholders,
wherein for said constructing, said system performs the actions of replacing each placeholder of said first plurality of placeholders in said first response template with said corresponding data value associated with the placeholder.

18. The system of claim 17, wherein said first response template contains an indication that a first placeholder of said first plurality of placeholders forming a sub-template can have multiple occurrences in said expected response, said system further performing the actions of:
determining one or more data values of said second plurality of data values associated with said first placeholder;
iteratively generating said multiple occurrences of said sub-template corresponding to said one or more data values,
wherein for said constructing, said system performs the actions of including said multiple occurrences of said sub-template in said expected response.

19. The system of claim 15, comprising a client system and a validation system together comprising said one or more processors,
wherein said client system sends said first request to said application server system and receives said first response,
wherein said client system further sends said first request to said validation system which in turn performs said retrieving and said constructing, said validation system then sending said expected response to said client system,
wherein said client system receives said expected response and performs said comparing,
wherein said validation system is implemented separate from said client system.

20. The system of claim 15, comprising a client system and a validation system together comprising said one or more processors, wherein said client system sends a validation request for said first request to said validation system, said validation system performing said sending, said receiving, said retrieving, said constructing and said comparing, said validation system sending to said client system, a result of said comparing as a response to said validation request, wherein said validation system is implemented separate from said client system.

* * * * *